United States Patent
Setlur et al.

(10) Patent No.: US 9,710,961 B2
(45) Date of Patent: Jul. 18, 2017

(54) METHOD AND APPARATUS FOR PROVIDING CONTEXTUAL RENDERING OF A MAP

(75) Inventors: Vidya Setlur, Cupertino, CA (US); Cynthia Kuo, Mountain View, CA (US); Agathe Battestini, Mountain View, CA (US); Tarik Crnovrsanin, Davis, CA (US)

(73) Assignee: NOKIA TECHNOLOGIES OY, Espoo (FI)

(*) Notice: Subject to any disclaimer, the term of this patent is extended or adjusted under 35 U.S.C. 154(b) by 1201 days.

(21) Appl. No.: 12/561,569

(22) Filed: Sep. 17, 2009

(65) Prior Publication Data

US 2011/0063301 A1    Mar. 17, 2011

(51) Int. Cl.
*G06T 17/05*    (2011.01)
*G09B 29/00*    (2006.01)

(52) U.S. Cl.
CPC ............ *G06T 17/05* (2013.01); *G09B 29/007* (2013.01)

(58) Field of Classification Search
CPC ... G06T 11/60; G01C 21/3667; G01C 21/367; G08G 1/0969; G09B 29/007
USPC .................................................. 345/637, 666
See application file for complete search history.

(56) References Cited

U.S. PATENT DOCUMENTS

| | | | |
|---|---|---|---|
| 5,864,337 A | 1/1999 | Marvin | |
| 2005/0134693 A1* | 6/2005 | Torimoto et al. | 348/207.99 |
| 2005/0195154 A1* | 9/2005 | Robbins et al. | 345/156 |
| 2007/0233379 A1* | 10/2007 | Bowman et al. | 701/211 |
| 2008/0077642 A1 | 3/2008 | Carbone et al. | |
| 2008/0132251 A1 | 6/2008 | Altman et al. | |
| 2008/0132252 A1 | 6/2008 | Altman et al. | |
| 2008/0238941 A1 | 10/2008 | Kinnan et al. | |
| 2009/0049408 A1 | 2/2009 | Naaman et al. | |
| 2009/0132484 A1 | 5/2009 | Massie et al. | |
| 2009/0204582 A1* | 8/2009 | Grandhi et al. | 707/3 |
| 2009/0210388 A1 | 8/2009 | Elson et al. | |
| 2009/0265099 A1 | 10/2009 | Gottlieb | |
| 2012/0005267 A1* | 1/2012 | Chen et al. | 709/203 |

OTHER PUBLICATIONS

Agrawala, M., Stolte, C.: Rendering Effective Route Maps: Improving Usability Through Generalization. Siggraph 2001, Last Modified: May 13, 2001, Accessed: Dec. 1, 2009, http://graphics.stanford.edu/papers/routemaps/.
Cartographic Generalization. Wikipedia, Last Modified: Jul. 24, 2009, Accessed: Dec. 18, 2009, pp. 1-4, http://en.wikipedia.org/wiki/Cartographic_generalization.

(Continued)

*Primary Examiner* — Jeffery A Brier
(74) *Attorney, Agent, or Firm* — Ditthavong & Steiner, P.C.

(57) ABSTRACT

An approach is provided for customizing map presentations. A semantic mapping platform determines context information for rendering a map on a user device. The semantic mapping platform then classifies a plurality of objects available for display in the map based on a level of association of each of the objects with the context information. The semantic mapping platform also prioritizes rendering of the objects based on the classification and causes, at least in part, actions that result in the rendering of the objects in the map according to the prioritization.

20 Claims, 15 Drawing Sheets

(56) References Cited

OTHER PUBLICATIONS

Patalaviciute, V., et al.: Using SVG-based Maps for Mobile Guide Systems. A Case Study for the Design, Adaptation, and Usage of SVG-based Maps for Mobile Nature Guide Applications, pp. 1-17, http://graphics.stanford.edu/papers/routemaps/, 2005.

Reichenbacher, T.: The World in Your Pocket—Towards a Mobile Cartography. pp. 1-9, http://129.187.175.5/lfkwebsite/fileadmin/user_upload/publications/reichenbacher/ICC2001_Paper.pdf, 2001.

Sheleiby, M., et al.: Automatic Map Scaling in Car Navigation Systems Using Context-aware Computing. World Applied Sciences Journal 3 (Supple 1), IDOSI Publications, pp. 1-6, http://idosi.org/wasj/wasj3(supplement%201)/16.pdf, 2008.

Warren, J.: Cartagen 0.6.1-Speed. Unterbahn, Posted: Jul. 29, 2009, Accessed: Dec. 1, 2009, pp. 1-7, http://unterbahn.com/tag/map-rendering/.

Yi, J.: Semantic Zoom. InfoVis: Wiki, Last Modified: Aug. 30, 2007, Accessed: Dec. 18, 2009, pp. 1-2, http://www.infovis-wiki.net/index.php/Semantic_Zoom.

Office Action for related U.S. Appl. No. 12/570,033 dated Jul. 17, 2012, pp. 1-14.

Office Action for related U.S. Appl. No. 12/570,033 dated Nov. 16, 2012, pp. 1-9.

\* cited by examiner

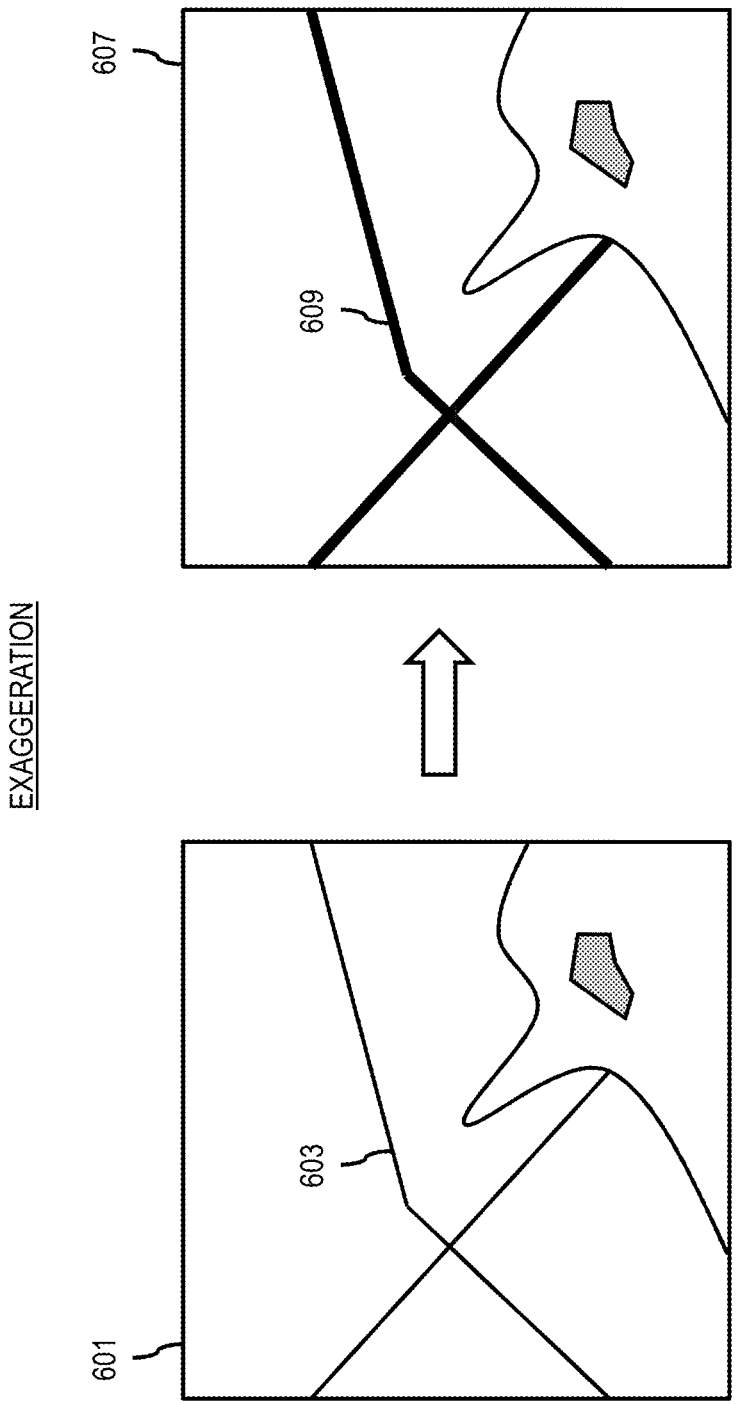

TYPICATION

METHOD AND APPARATUS FOR PROVIDING CONTEXTUAL RENDERING OF A MAP

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for providing contextual rendering of maps provided by mapping services. More specifically, electronic mapping services are capable of providing vast stores of detailed information relating to features of a map (e.g., points of interest, roads, terrain, geographical features, etc.). However, the amount of mapping detail available from modern mapping services can quickly overwhelm the display capability of a device as well as a user's ability to comprehend the information. Accordingly, service providers and device manufacturers are challenged to develop new mechanisms for organizing and presenting mapping information to display, highlight, or otherwise indicate contextually appropriate information of most relevance or importance to a particular user.

SOME EXAMPLE EMBODIMENTS

Therefore, there is a need for an approach for automatically and efficiently providing contextual rendering of a map.

According to one embodiment, a method comprises determining context information for rendering a map on a user device. The method also comprises classifying a plurality of objects available for display in the map based on a level of importance of each of the objects with respect to the context information. The method further comprises prioritizing rendering of the objects based on the classification. The method further comprises causing, at least in part, actions that result in the rendering of the objects in the map according to the prioritization.

According to another embodiment, an apparatus comprising at least one processor, and at least one memory including computer program code, the at least one memory and the computer program code configured to, with the at least one processor, cause, at least in part, the apparatus to determine context information for rendering a map on a user device. The apparatus is also caused, at least in part, to classify a plurality of objects available for display in the map based on a level of importance of each of the objects with respect to the context information. The apparatus is further caused, at least in part, to prioritize rendering of the objects based on the classification. The apparatus further causes, at least in part, actions that result in the rendering of the objects in the map according to the prioritization.

According to another embodiment, a computer-readable storage medium carrying one or more sequences of one or more instructions which, when executed by one or more processors, cause, at least in part, an apparatus to determine context information for rendering a map on a user device. The apparatus is also caused, at least in part, to classify a plurality of objects available for display in the map based on a level of importance of each of the objects with respect to the context information. The apparatus is further caused, at least, to prioritize rendering of the objects based on the classification. The apparatus further causes, at least in part, actions that result in the rendering of the objects in the map according to the prioritization.

According to another embodiment, an apparatus comprises means for determining context information for rendering a map on a user device. The apparatus also comprises means for classifying a plurality of objects available for display in the map based on a level of importance of each of the objects with respect to the context information. The apparatus further comprises means for prioritizing rendering of the objects based on the classification. The apparatus further comprises means for causing, at least in part, actions that result in the rendering of the objects in the map according to the prioritization.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6D are diagrams of maps differentially scaled using respectively exaggeration, elimination, typication, and outline simplification, according to various embodiments;

DESCRIPTION OF SOME EMBODIMENTS

Examples of a method, apparatus, and computer program for providing contextual rendering of a map are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
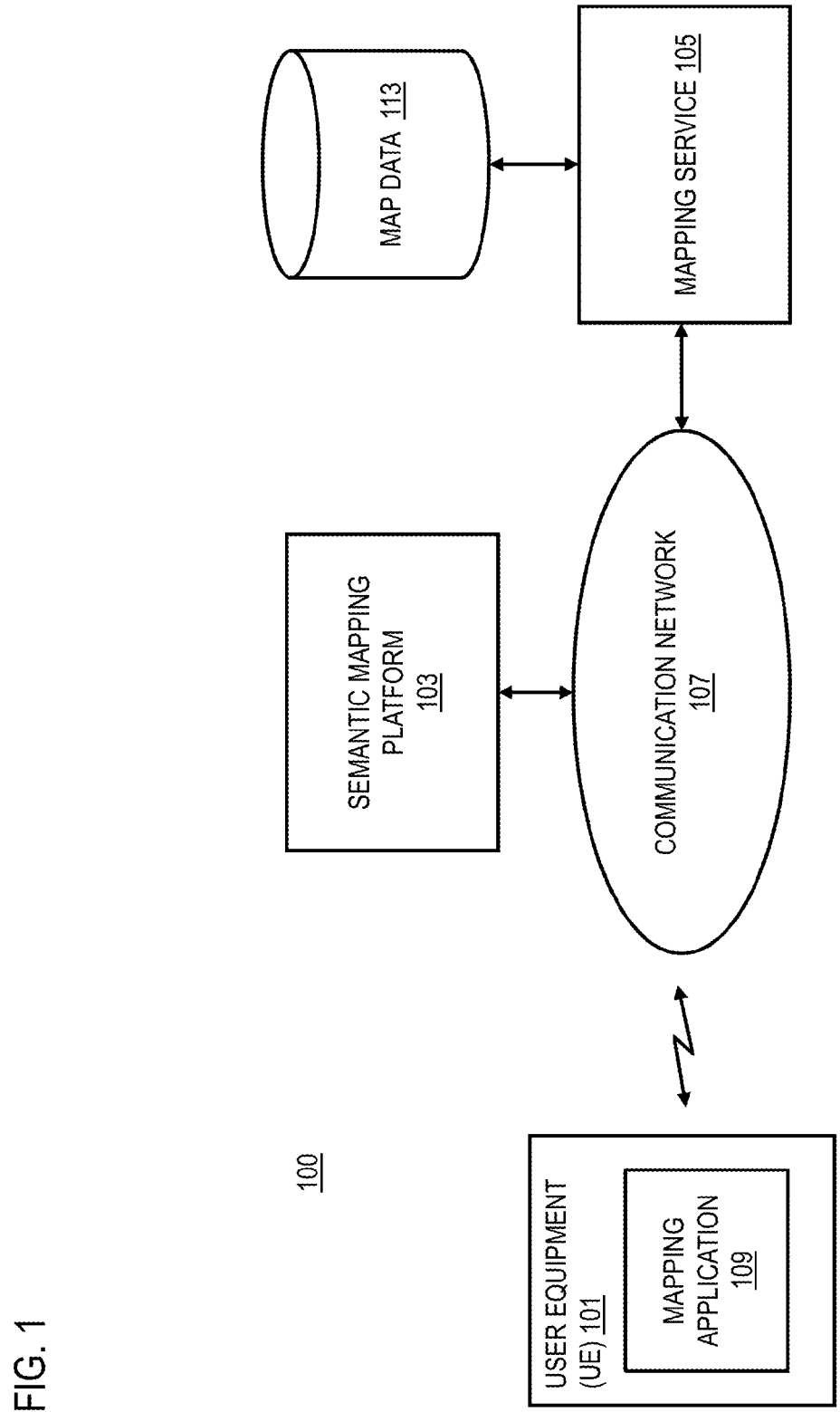
FIG. 1 is a diagram of a system capable of providing contextual rendering of a map, according to one embodiment.

FIG. 1 is a diagram of a system capable of providing contextual rendering of a map, according to one embodiment. It is recognized that maps are abstractions or generalizations of physical reality, and their effectiveness as a communication medium is strongly influenced by, for instance, the nature of the spatial data, the form and structure of representation, the intended purpose, the experience of the viewer, and the context and time in which the images are viewed. In other words, effective visual communication via a map depends on how effectively the map reflects the context in which it is used. For example, a map that is contextually targeted to tourists may deliberately mix a perspective view of streets (e.g., to show an overview of streets to allow people to find their ways) with frontal views of points of interest (e.g., to facilitate recognition of the points of interest). Traditionally, these contextual maps are hand designed for each separate context, but creating effective maps by hand for every user in situation or context would be too expensive and time-consuming to be practical.

Moreover, the advent of electronic mapping service has failed to overcome the problem of producing contextual maps. In fact, the vast amounts of mapping data available in these mapping services may make the problem even worse in that a user may need to sift through even more information to find the information that is important or relevant to the user. Conventional electronic mapping services attempt to overcome these challenges by providing navigation routing, showing points of interest in, and providing functions such as zooming in and out of maps, but do not directly address the problem. Generally, conventional electronic maps are often composed of vector primitives that are inherently resolution independent. This means that maps can be uniformly resized or zoomed to any target resolution without any visible distortions or artifacts. Such resizing or zooming is often performed using a process based on uniform scaling wherein all of the individual map primitives (e.g., roads, text labels, water bodies, parks, points of interest, etc.) are uniformly resized. However, this map rendering process does not take into consideration the context or viewport in which the map will be used. For example, in a tourist map, places of interest likely need to be scaled to a larger size when compared to less important map features.

To address this problem, the system 100 of FIG. 1 introduces the capability for automated map retargeting by differentially rendering or causing, at least in part, actions that result in the differential rendering of objects in a map to reflect the context in which the map will be used. More specifically, map retargeting is a process of optimizing mapping data for a specific purpose or display need. For example, the same map data may be retargeted to serve the navigational needs of a business traveller as well as the needs of a tourist wanting to explore a new city. In one embodiment, this retargeting is accomplished by customizing the rendering, manipulation, and interaction of the individual map objects (e.g., roads, water, text labels, etc.) to enhance the degrees of freedom in terms of how map applications can be created for various types of end-users depending on the context associated with the users. In other words, the approach described herein abandons the traditional uniform scaling of conventional electronic mapping services by applying differential levels of detail to each object in the map based on the semantic importance of the object to the context of the map. This approach is also termed "semantic zooming" in which the map is zoomed in to display those objects of semantic importance (i.e., relevance to a particular context). For example, under this contextual rendering or semantic zooming approach, roads near more popular points of interest (POIs) in a tourist map would be semantically classified to be more important or relevant than roads near POIs of lesser interest to tourists. Similarly, on a mobile device, map objects near the location of the mobile device may be more important than map objects that are farther away.

The following describes uses cases for the system 100 in the following contexts: (1) personal information management (PIM), (2) mobile applications, and (3) customizable maps, e.g., tourist maps. PIM is a rapidly growing area of research concerned with how people store, manage, and recall information. The approach described herein can use contextually relevant imagery to composite map visuals for personal data (e.g., addresses of contacts or locations of appointments). Using imagery helps reduce the cognitive overload that often results when users face a deluge of information.

Mobile applications, particularly mapping applications, are quickly becoming ubiquitous given recent hardware, platform development, and mobile Internet connectivity gains. However, many mobile devices (e.g., cellular telephones) are not well suited for traditional iterative tile-based rendering given limited display sizes and processing capabilities. The system 100 can facilitate a more efficient way of rendering maps on the mobile device. For example, the contextual rendering described herein can prioritize the rendering of the portions of the map that displays routing from the user's current position to a selected destination before rendering other portions of the map. In this way, the route can be quickly rendered on the mobile map display while other less important portions of the map (e.g., portions not directly on the user's route) based on available processing and network bandwidth resources.

As described previously, the approach described herein is well suited to rendering customizable maps such as tourist maps. Hand-drawn informational maps such as city guides and tourist maps traditionally provide information as to which landmarks are popular or worth visiting at a given place. The information in these maps is carefully designed to specifically help visitors easily locate points of interest (POIs). However, consider the scenarios where one would like to view popular landmarks based on recent trends (e.g. the past year) or of a place for which a visitor may not have access to the local tourist guide. While pre-authored maps and guides are meticulously designed to emphasize the most important areas in an intuitive and aesthetic manner, they are static representations that are often not adaptable. The system 100 can take existing map data and retarget it to specific customizations, be it a tourist map, a subway map or a pedestrian map and use the importance of the data semantics to dictate what appears and how the information appears on the map.

As shown in FIG. 1, the system 100 comprises a user equipment (UE) 101 having connectivity to a semantic mapping platform 103 and a mapping service 105 via a communication network 107. In one embodiment, the semantic mapping platform 103 facilitates the rendering of contextual maps by either the mapping service 105 or a mapping application 109 executed by the UE 101. For example, the semantic mapping platform 103 heuristically manipulates individual map objects retrieved from the database 113 of map data via the mapping service 105. The manipulation performed by the semantic mapping platform 103 includes, for instance, providing differential scaling and levels of detail for map objects based on the importance or relevance of the objects to the contextual map. More specifically, the semantic mapping platform 103 extracts the map objects that comprise the contextual map as map primitives (e.g., vector-based representations) along with metadata or other information associated with the objects. The metadata can be used to compute a level of importance or relevance of the objects to the context of the map. Based on the computed level of importance, the semantic mapping platform 103 can enhance the most important map objects and/or reduce the details of the less important map objects. The semantic mapping platform 103 then interacts with the mapping service 105 and/or the mapping application 109 to initiate or cause, at least in part, actions that result in the rendering of the final map. In certain embodiments, the semantic mapping platform 103 can directly render or cause, at least in part, the rendering of the final map without interaction with either the mapping service 105 or the mapping application 109.

In another embodiment, the mapping service 105 is a managed service provided by a service provider or operator of the network 107 (e.g., Ovi Map). By way of example, the mapping service 105 collects, assembles, stores, updates, and supplies map data and map formats to users and/or subscribers to the service 105. The mapping data is stored in, for instance, the map data database 113. As shown, the map data database 113 has connectivity to the mapping service 105. However, it is contemplated that the database 113 may have direct connection to the network 107, the semantic mapping platform 103, and/or the mapping application 109. There may also be multiple databases (not shown) containing map data within the system 100. The multiple databases may operate independently or in synchronization to provide map data to users of the network 107. As discussed previously, the map data database 113 stores map data including map objects or primitives and their associated metadata.

The mapping application 109 may operate as a client of the semantic mapping platform 103 and/or the mapping service 105 to provide mapping information to the UE 101. In addition or alternatively, the mapping application 109 may operate independently to provide the same functions as the mapping service 105 and/or the semantic mapping platform 103. In one embodiment, the semantic mapping platform 103 and the mapping service 105 can be implemented via shared, partially shared, or different computer hardware (e.g., the hardware described with respect to FIG. 9).

By way of example, the communication network 107 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may also be equipped with one or more location sensors (e.g. a global positioning satellite (GPS) sensor) for use with the semantic mapping platform 103, mapping service 105, and/or mapping application 109.

By way of example, the UE 101, the semantic mapping platform 103, and the mapping service 105 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
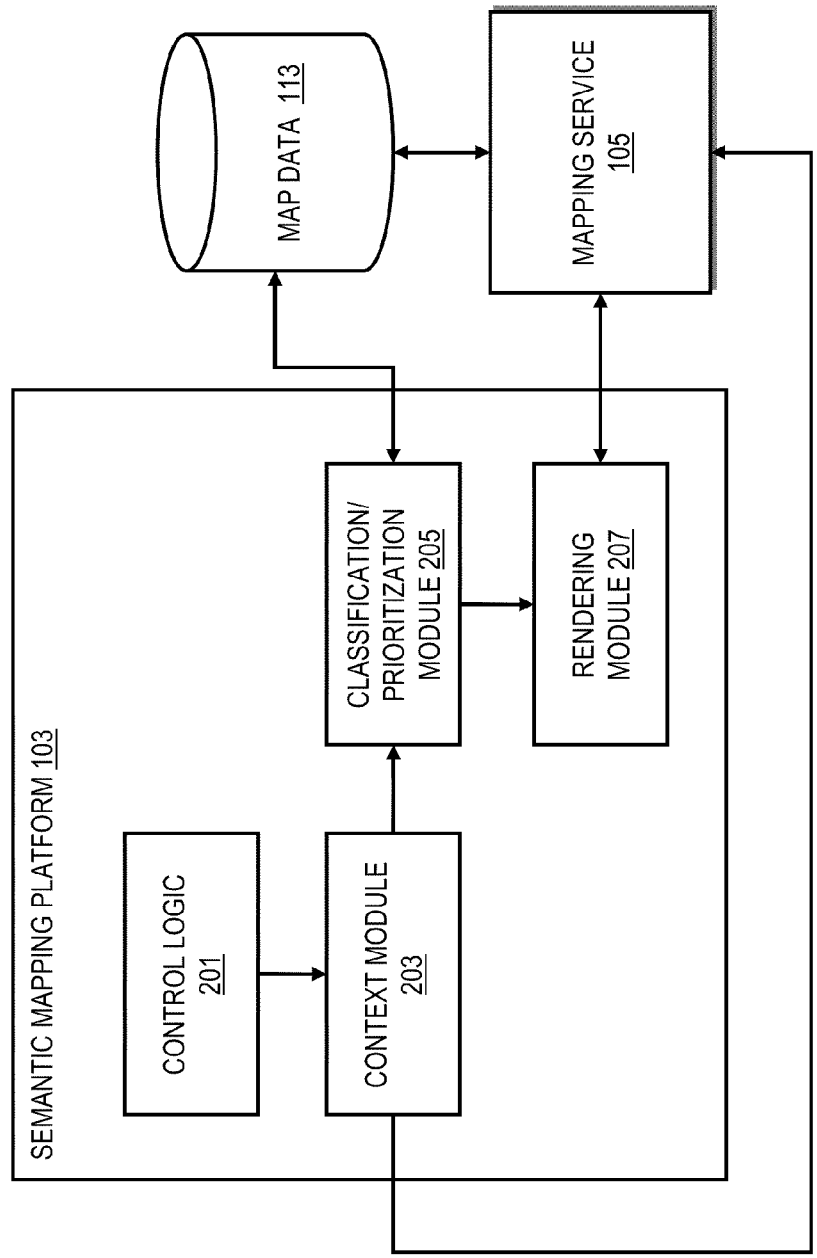
FIG. 2 is a diagram of the components of a semantic mapping platform, according to one embodiment.

FIG. 2 is a diagram of the components of a semantic mapping platform, according to one embodiment, according to one embodiment. By way of example, the semantic mapping platforms 103 includes one or more components for providing contextual rendering of a map. It is contemplated that the functions of these components may be combined in one or more components or performed by other components of equivalent functionality. In this embodiment, the semantic mapping platform 103 includes at least a control logic 201 which executes at least one algorithm for executing functions of the semantic mapping platform 103. For example, the control logic 201 interacts with the context module 203 to determine context information for rendering a map. The context information directs what type of map and what map objects are important to the map. In one embodiment, the context module 203 communicates with the mapping service 105, the mapping application 109, the UE 101, or other component of the network 107 to determine context information. The context information may describe, for instance, an intended purpose of the map (e.g., tourist map, navigation map, hiking map, etc.), a environment for use of the map (e.g., walking, in a car, etc.), user interests (e.g., favorite POIs), and the like.

The context module 203 may use a variety of mechanisms to determine the context information. In one mechanism, the context module 203 may receive direct input specifying a particular context. For example, a user may directly specify that the user would to display a tourist map of a particular city. In another mechanism, the context module 203 can detect what mapping service 105 or mapping application 109 has initiated the request for a contextual map. For example, if a navigation service has requested the map, the context module 203 may infer that the context of the map is for turn-by-turn navigation. Accordingly, the context would place a higher level of importance on routing and traffic information.

In yet another mechanism, the context module 203 may infer a context from the location of the requestor. For example, if a user requests a contextual map while located in a shopping center, the context module 203 may infer that the context of the map is related to shopping and will place a higher level of importance on points-of-interests or other map objects related to shopping. Other indirect methods for determining context include, evaluating a recent history of online searches or recently view websites, evaluating recent communications (e.g., voice, text messages, and e-mails) for key words related to particular contexts, or monitoring historical travel patterns or activities. It is contemplated that any mechanism can be used by the context module 203 to determine context.

The context module 203 may then interact with the classification/prioritization module 205 to classify available map objects against the determined context. The classification/prioritization module 205 uses, for instance, semantic information to determine the importance or relevance of each object to the context and classify the objects according the importance. By way of example, the module 205 retrieves the metadata associated with each object from the map data database 113. The metadata includes information such as the object's name, category (e.g., road, point of interest, water body, park, etc.), and location. The module 205 then performs a semantic analysis on the metadata to determine a level of association of the metadata with determined context. This level of association, in one embodiment, represents, at least in part, the level or importance or relevance of the corresponding object to the determined context. For example, if the context is a hiking trip, the module 205 may classify map objects with metadata that indicate an association with national parks in a category of higher importance that objects associated with shopping malls.

Once all of the available objects have been classified, the module 205 prioritizes the rendering of the classified objects for rendering. Prioritization includes determining the specific order for rendering the classified objects by determining which classifications to render first and then which objects within the classifications to render first. In other words, rather than iteratively displaying the map tile-by-tile as conventionally done, the prioritization by the module 205 determines which objects to render first based on the classified level of importance. In this way, the module 205 can cause, at least in part, the rendering module 207 to, for instance, immediately display portions of the map that are most relevant and then iteratively fill in other less important objects afterwards.

In one embodiment, the rendering module 207 interacts with the mapping service and/or the mapping application 109 to render or cause, at least in part, actions that result in the rendering of the final map based on the prioritization of the classification/prioritization module 205. In particular, the rendering module 207 determines what objects and in what detail can be displayed on the UE 101 given the display area available on the UE 101. Based on the level of detail available, the rendering module 207 performs or causes, at least in part, actions that result in differential rendering or scaling of the map objects to be displayed based on their associated prioritization. In one embodiment, the rendering module 207 uses various mechanisms (e.g., exaggeration, elimination, typication, outline simplication—described with respect to FIG. 4 below) to either enhance or lower the detail for rendering a map object.

In certain embodiments, the mapping service 105 and/or the mapping application 109 may use a vector rendering engine to generate the final map image from the vector primitives corresponding to the map objects to be displayed. These vector primitives, for instance, are models that use, e.g., a data structure or vector-based language, to describe the appearance of map objects in a resolution independent manner. The vector rendering engine then converts these models to a digital or raster graphics image that is displayable by the UE 101.

In addition or alternatively, the mapping service 105 and/or the mapping application 109 may use tile-based map rendering. In contrast to a vector rendering engine, a map tile renderer does not directly interpret vector primitives to generate a final map. Instead, the map tile renderer creates a map image by compositing tiles (e.g., pre-rendered images representing specific sections of the map). To support map tile renderers, the rendering module 207 may pregenerate tiles of differing amounts of detail that can be iteratively displayed using a map tile renderer.

Alternatively, the functions of the semantic mapping platform 103 and/or the mapping service can be implemented via an access control application (e.g., a widget) (not shown) in the UE 101 according to another embodiment. Widgets are light-weight applications, and provide a convenient means for presenting information and accessing services. It is contemplated that the functions of these components may be combined in one or more components or performed by other components of equivalent functionality. In this embodiment, the access control application includes modules similar to those of the semantic mapping platform 103, as previously described. To avoid data transmission costs as well as save time and battery, its control logic can fetch map data cached or stored in its own database, without requesting data from any servers or external platforms, such as the semantic mapping platform 103 or the mapping service 105. Usually, if the UE 101 is online, data queries are made to online search server backends, and once the device is off-line, searches are made to off-line indexes locally.

Figure 3:
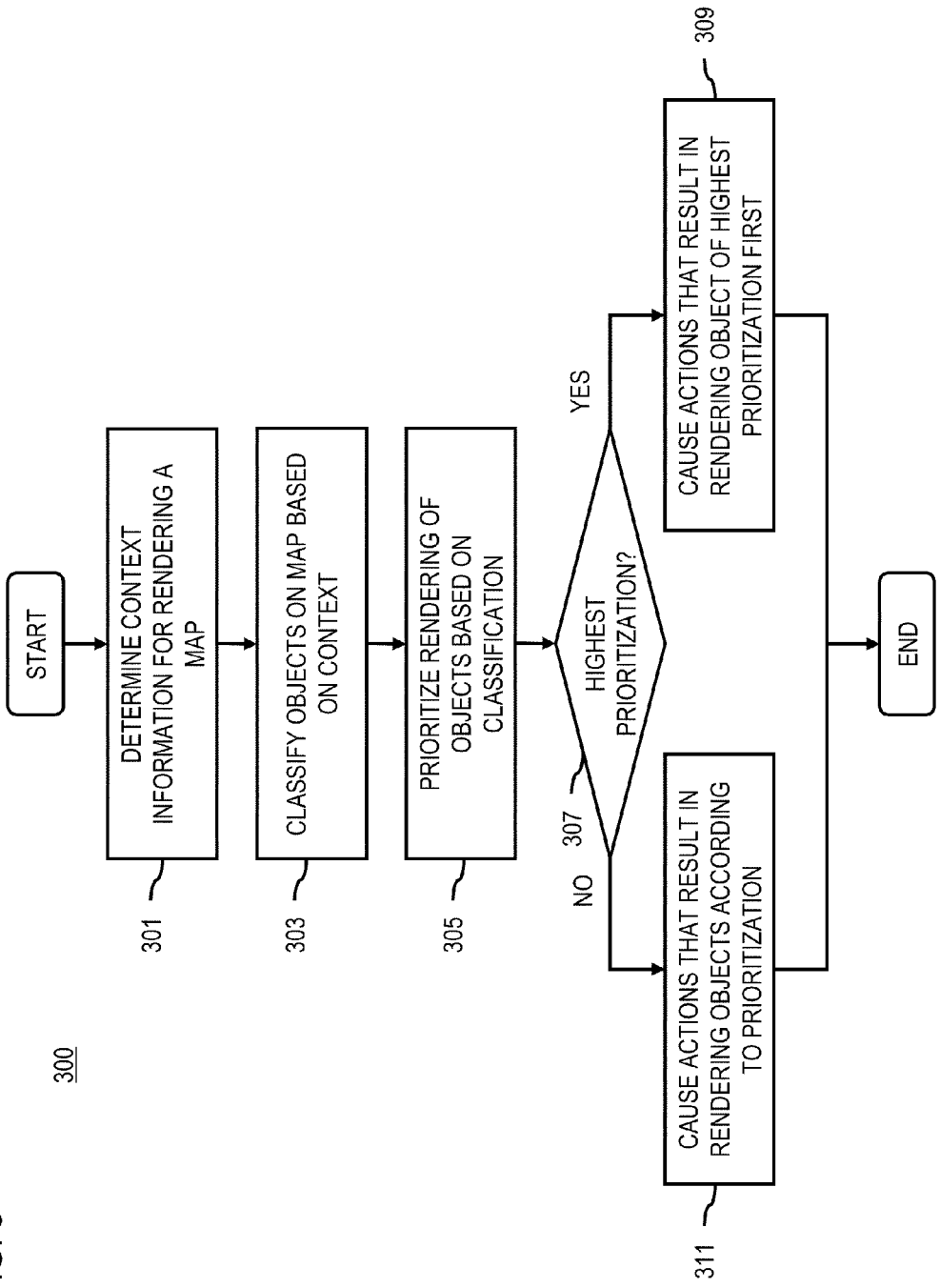
FIG. 3 is a flowchart of a process for providing contextual rendering of a map, according to one embodiment.

FIG. 3 is a flowchart of a process for providing contextual rendering of a map, according to one embodiment. In one embodiment, the semantic mapping platform 103 performs the process 300 and is implemented in, for instance, a chip set including a processor and a memory as shown FIG. 10. In step 301, the semantic mapping platform 103 determines context information for rendering a map on the UE 101. As described with respect to FIG. 2, the semantic mapping platform 103 can interact with the mapping service 105, mapping application 109, or the UE 101 to collect and analyze information to either determine or infer the context of a particular map request. In addition to the area to be displayed on the map, the context information includes, for instance, how the user plans to use the map, what features of the map are important to the user and to the purpose of the map, where the map is to be used, what information is to be presented on the map, and the like.

Next, the semantic mapping platform 103 classifies the objects available for display in the map based on a level of association (e.g., importance or relevance) of each of the objects to with the context information (step 303). In one embodiment, the set of objects available for display is a function of the area selected for display. That is, all objects associated with the particular area selected for display may be available. In areas where there are a dense selection of objects (e.g., roads, POIs, terrain features, etc.) such as cities, the number of available objects can be large. Accordingly, classification of the objects with respect to the context can facilitate the narrowing down of potential objects for display to reduce display clutter. It is contemplated that the classification may include any number of classes based on for instance a graduated scale of relative importance or relevance to the context information. For example, an increasing scale of five levels of importance from lowest to highest may be created. The semantic mapping platform 103 may then classify each available object according to the five level scale using the object's metadata and semantic information regarding the context.

After classification is complete, the semantic mapping platform 103 prioritizes the rendering of the available objects based on the classification (step 305). In many cases, the prioritization of the objects matches the classification of the levels of importance. However, in other cases, the semantic mapping platform 103 may heuristically alter the prioritization. For example, a map object classified in the highest importance or relevance category may nonetheless be prioritized lower for rendering if another object that is only slight less importance is located closer to the a user. As previously discussed, prioritization can be performed at between established classes or within the class itself. It is also contemplated that classification and prioritization may be combined if the semantic mapping platform 103 is configured to classify or prioritize each object individually. It is noted that classification enables the semantic mapping platform to potentially reduce the processing time associated with prioritization by enabling the elimination of entire classes of objects based on their level of importance or relevance. For example, the semantic mapping platform 103 may be configured to not render any objects rated in the lowest classes of importance. As a result, the semantic mapping platform 103 need not expend computational resources prioritizing objects in those lowest classes of importance.

In one embodiment, the semantic mapping platform 103 determines which of the objects have the highest prioritization (step 307), and renders or causes, at least in part, actions that result in the rendering of those with the highest prioritization first (step 309). In this way, the user can be presented with the most highly relevant or important information first. Then, the semantic mapping platform 103 can fill in the remaining objects as resources allow. This approach is particularly advantageous when rendering maps on a mobile device with limited computational resources. In such a case, rendering the entire map can be quite time-consuming. Therefore, if no prioritization of rendering were employed, the user may have to wait before portions of the map of most relevance to the user is rendered. If all objects of highest priority have been rendered, then the semantic mapping platform can render or cause, at least in part, actions that result in the rendering of the remaining objects according to their determined prioritization (step 311).

Figure 4:
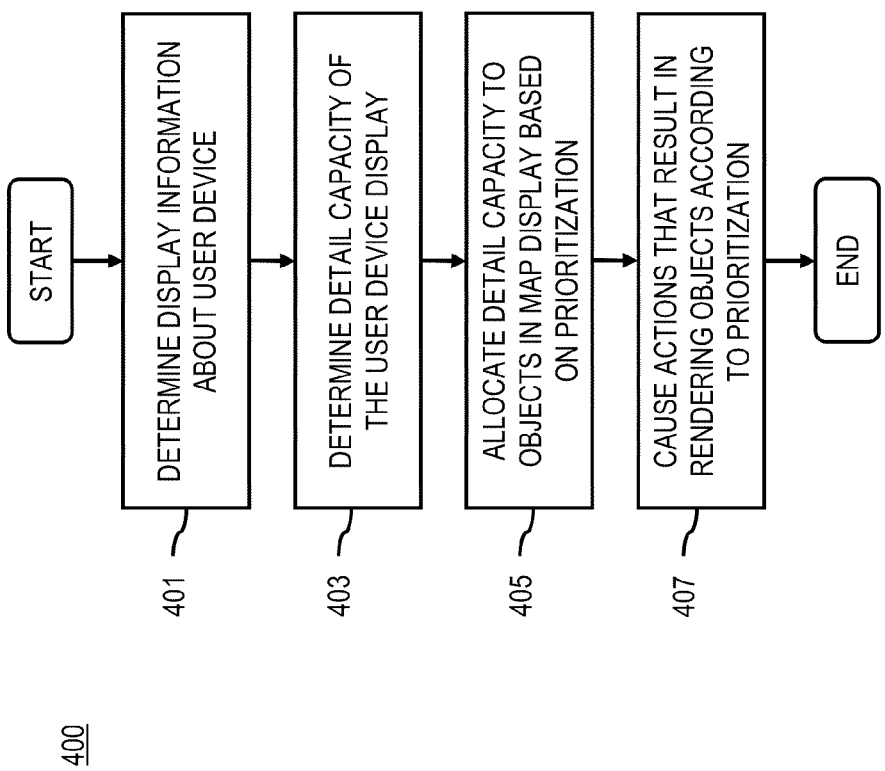
FIG. 4 is a flowchart of a process for allocating detail for rendering a contextual map, according to one embodiment.

FIG. 4 is a flowchart of a process for allocating detail for rendering a contextual map, according to one embodiment. In one embodiment, the semantic mapping platform 103 performs the process 400 and is implemented in, for instance, a chip set including a processor and a memory as shown FIG. 10. In step 401, the semantic mapping platform 103 determines display information about a display area available on the UE 101. By way of example, the display information includes the physical size of the display area, the resolution of the display of area, and the style of the map selected for display. Based on these parameters, the semantic mapping platform 103 determines a detail capacity associated with a total amount of detail that can be presented in the display area (step 403). As used herein, the term "detail" refers to spatial detail which is a measure of the feature density of objects. For example, a white sphere has less spatial detail that a soccer ball with the same dimensions. The detail capacity is the maximum amount of detail available to the display map objects while maintaining the recognizability of key objects in the map and represents the overall spatial detail in the map. In certain embodiments, the map is partitioned into sections. In this case, the semantic mapping platform 103 can determine the detail capacity for each section individually. If the map is partitioned uniformly, the detail capacity can be uniform for each section. Conversely, if the map is partitioned non-uniformly, the detail capacity varies with each section.

The semantic mapping allocation then allocates the detail capacity among the objects to be rendered in the map according to the prioritization of the objects (e.g., performed according to the process of FIG. 3) (step 405). In other words, the detail capacity is redistributed among the map objects by exaggerating more important objects and simplifying less important map objects. The amount of exaggeration of simplication is based on the target size of the map, the target style of map, and the prioritization of the map objects.

The semantic mapping platform 103 then renders or causes, at least in part, actions that result in the differential rendering of the map objects based on the allocation or redistribution of the detail capacity (step 407). The process of differential rendering includes applying the techniques of exaggeration to enhance detail or the techniques of elimination, typication, and/or outline simplification to reduce detail. By way of example, exaggeration consists of both size and line exaggeration rules (see FIG. 6A for an example of exaggeration). These rules are applied to increase the spatial detail and visibility of the map object. Differential rendering as described herein increases a map object's size to satisfy the spatial detail allocation applied to the object. If the object is just a line stroke, such as routes in informational images, exaggeration is applied by increasing the line weight rather than increasing the object size.

Figure 6B:
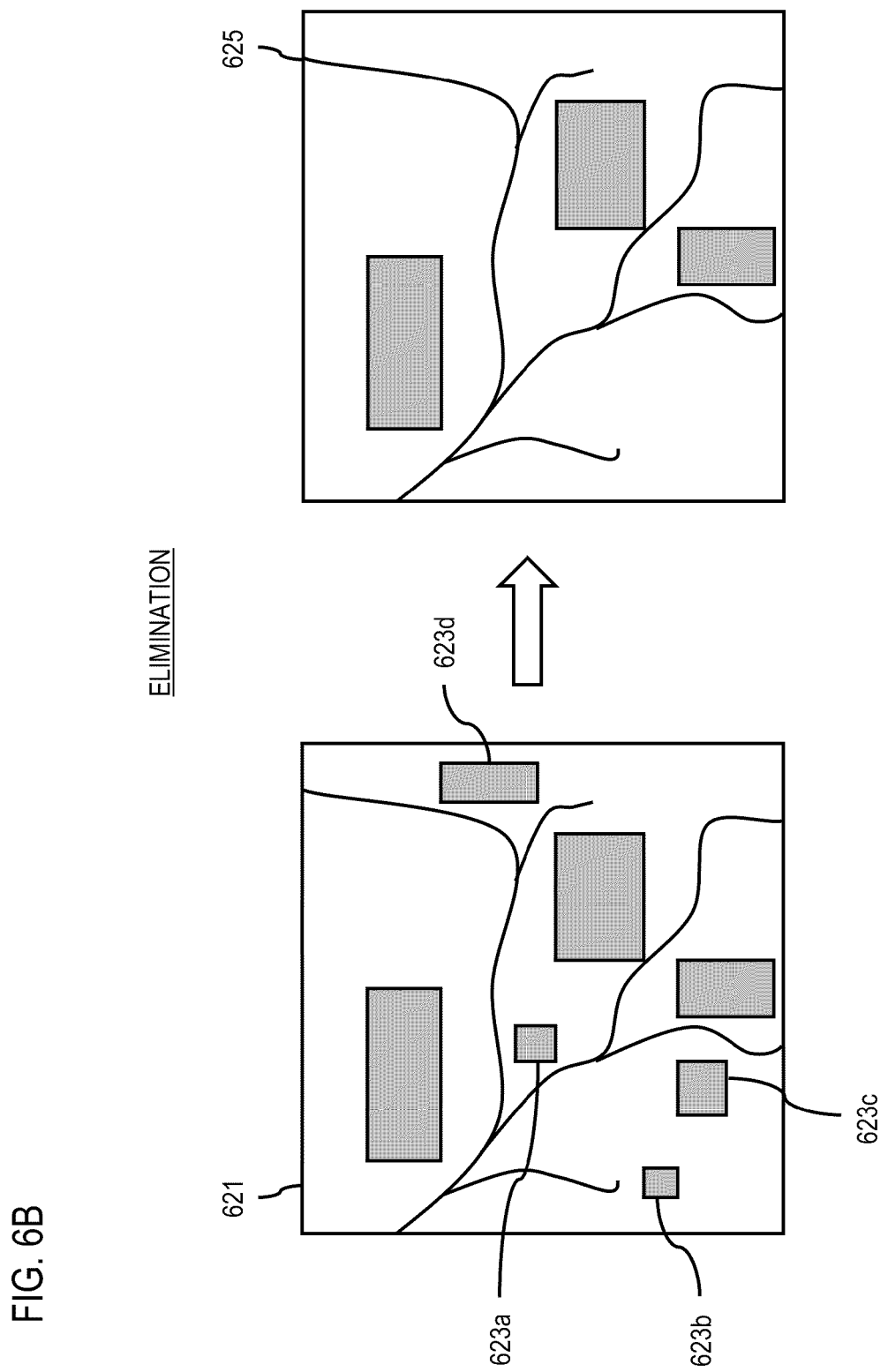

Elimination is a process to reduce map detail by selectively removing regions inside objects that are too small to be presented in the map rendering (see FIG. 6B for an example of elimination). Beginning from the smallest lines and regions corresponding to objects in a map, details are iteratively eliminated until the detail capacity for map is satisfied.

Figure 6C:
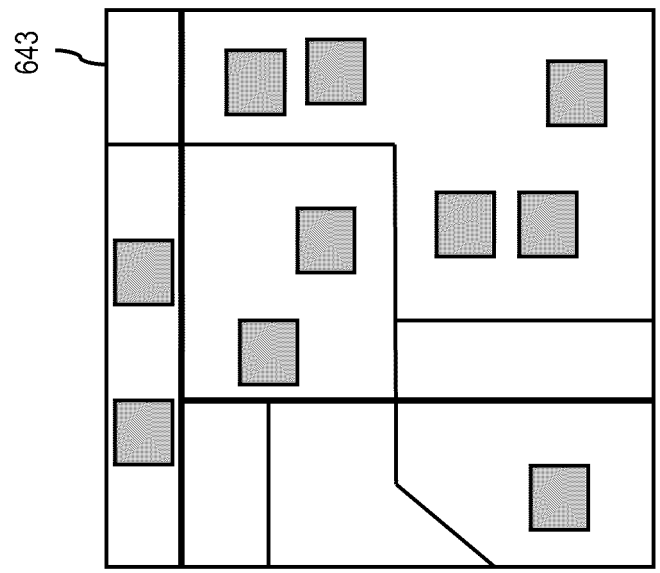
Figure 6C:
Figure 6C:
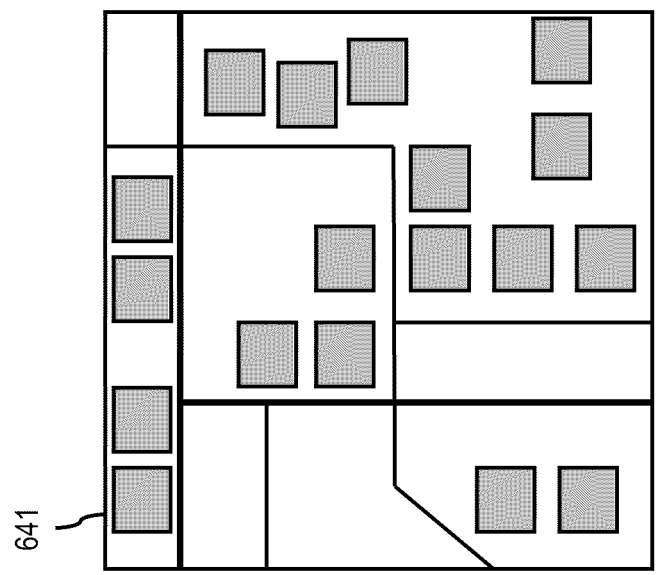

Typication is a process for reducing feature density and detail a map while maintaining the representative distribution patter of the original feature group of map objects (see FIG. 6C for an example of typication). Typication is a form of elimination constrained to apply to multiple similar map objects. In one embodiment, the semantic mapping platform 103 applies typication based on object similarity.

Figure 6D:
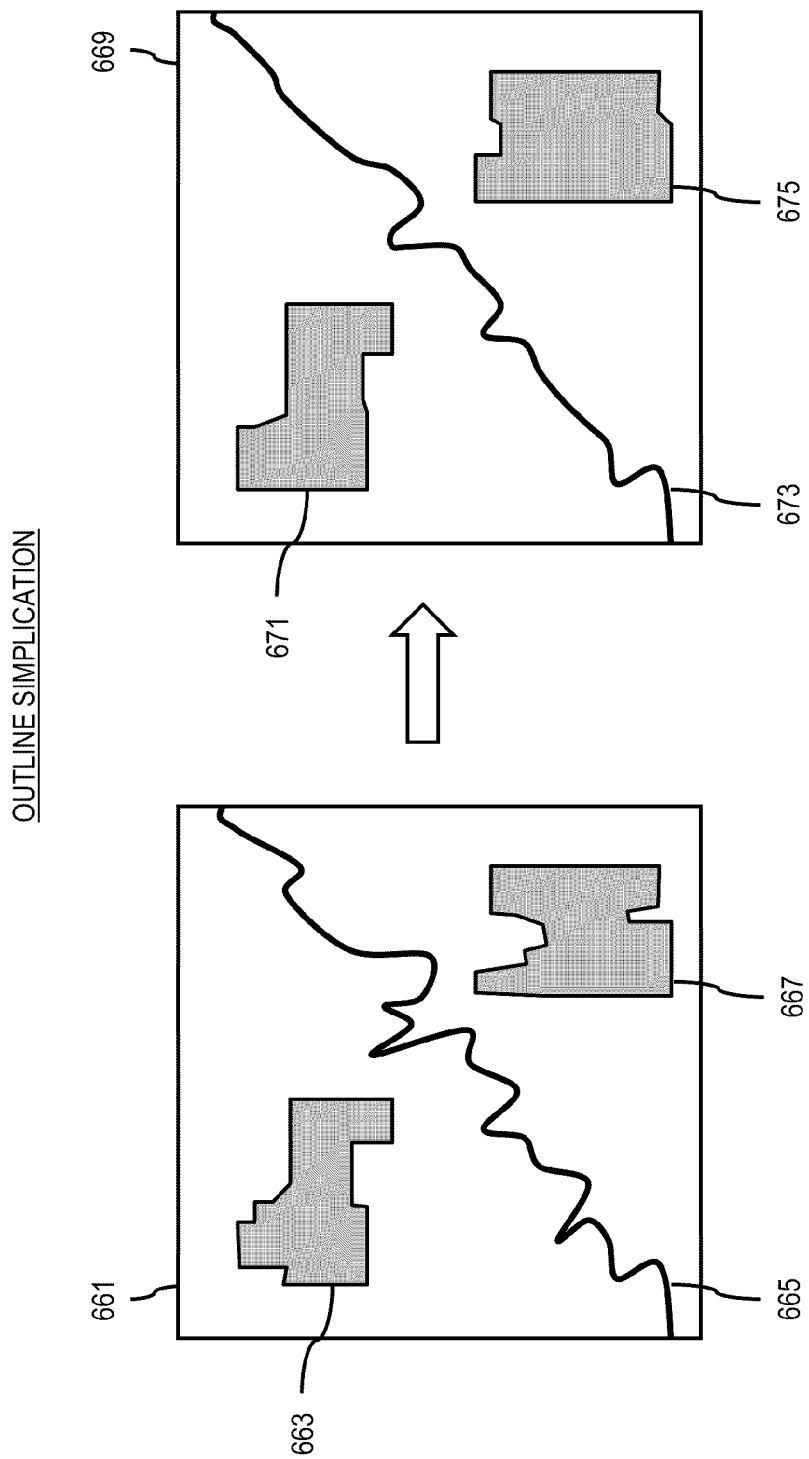

Outline simplication reduces the complexity of map objects (see FIG. 6D for an example of outline simplication). Often control points of the Bezier curves of the map objects or primitives, representing ink lines at map object boundaries become too close together resulting in a noisy of the map object. Outline simplication reduces the number of controls to relax the Bezier curve representing the vector-based drawing of the map object. In one embodiment, the semantic mapping platform uses a vertex reduction technique in which successive vertices that are clustered too closely are reduced to a single vertex. The semantic mapping platform 103 iteratively combines control points of the Bezier curve that are within a minimum separation distance until the detail allocation is satisfied for the object. Anti-aliasing can also be applied in conjunction with outline simplication to minimize the occurrence of scaling effects in the outlines of map objects.

Figure 5:
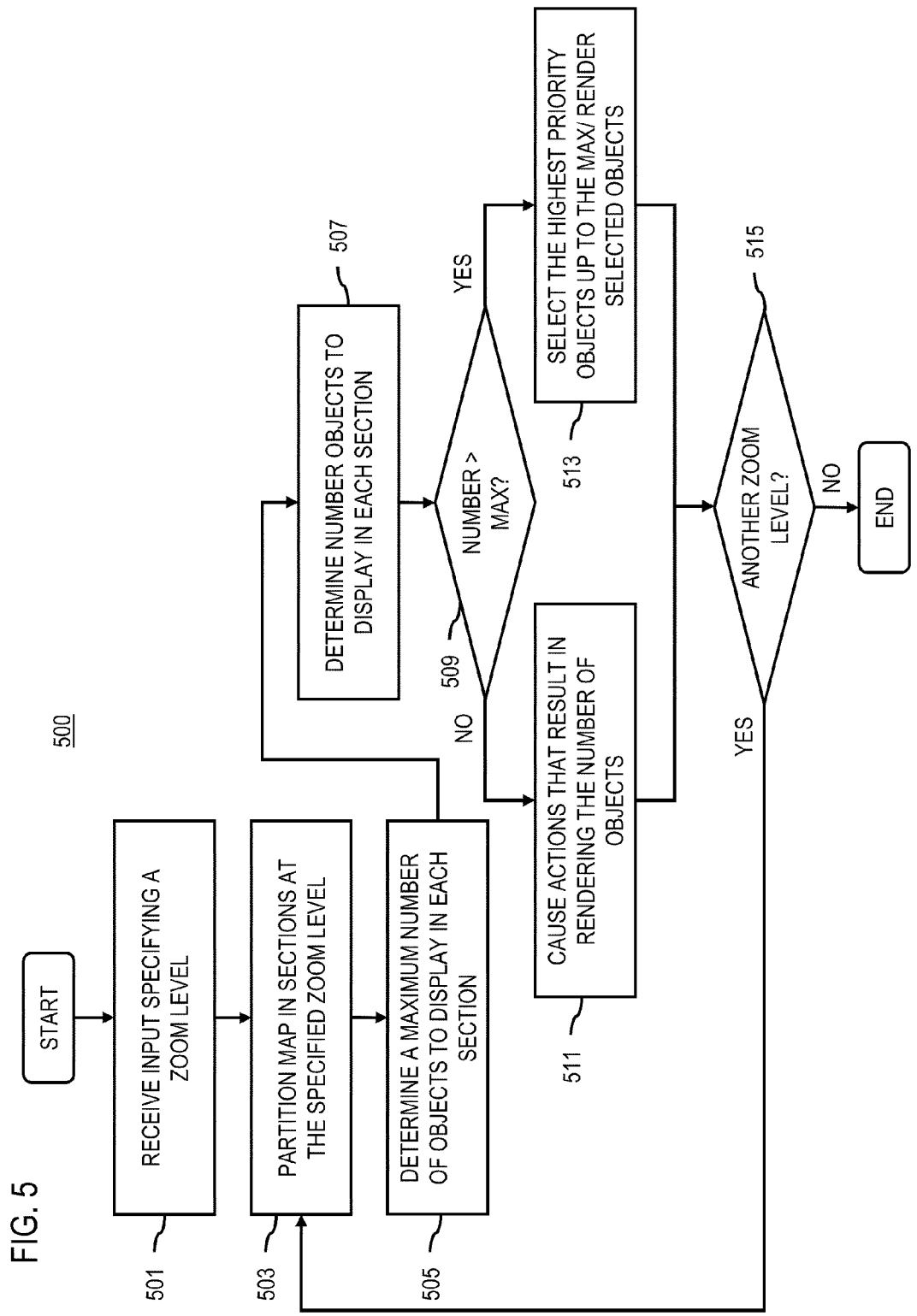
FIG. 5 is a flowchart of a process for providing contextual rendering of a map at a specified level of zoom, according to one embodiment.

FIG. 5 is a flowchart of a process for providing contextual rendering of a map at a specified level of zoom, according to one embodiment. In one embodiment, the semantic mapping platform 103 performs the process 500 and is implemented in, for instance, a chip set including a processor and a memory as shown FIG. 10. In step 501, the semantic mapping platform 103 receives an input specifying a zoom level. By way of example, the specified zoom level may be either a physical zoom level or a semantic zoom level. A physical zoom level can specify either a larger area (e.g., zooming out) or a smaller area (e.g., zooming in) for rendering a map. On the other hand, a semantic zoom level does not necessarily involve changing the physical area displayed by the map. Instead, a semantic zoom includes increasing detail (e.g., semantically zooming out) or decreasing detail (e.g., semantically zooming in) of a map rendering.

Next, the semantic mapping platform 103 partitions the map into sections at the specified zoom level (step 503). In one embodiment, the sections are defined according to lines of latitude and longitude on the map. It is contemplated that any demarcation of the map sections may be used. In addition, the sections may be either uniform or different in sizes. The semantic mapping platform 103 determines a maximum number of objects that can be displayed in each of the sections (step 505). The maximum number of objects can be determined according to the detail capacity of each section as described with respect to FIG. 4. The semantic mapping platform 103 then determines the number of objects that is to be displayed in each section based on a prioritization of the objects available for display in the particular section (step 507). For each section, the semantic mapping platform 103 determines whether the number objects to be displayed exceeds the maximum number of objects that can be displayed (step 509). If the maximum is not exceeded, the same number of objects rendered at the previous zoom level can be rendered at the new zoom level (step 511). If the maximum is exceeded, the semantic mapping platform 103 selects the objects with the highest prioritization up to the maximum number of objects to be displayed (step 513). For example, if ten objects were displayed at the previous zoom level and now only six objects can be displayed, the semantic mapping platform 103 will select the six objects with the highest prioritization for display. The remaining four objects are not displayed. At step 515, the semantic mapping platform 103 waits for receipt of a command to render another zoom level. If such as request is received, the process 500 returns to the process of step 503 and continues.

FIGS. 6A-6D are diagrams of maps differentially scaled using respectively exaggeration, elimination, typication, and outline simplication, according to various embodiments. FIG. 6A depicts a map 601 on which the exaggeration process is applied to enhance the detail of the streets 603. As discussed previously, the process of exaggeration increases the details of a map object by either increasing the size of the object of increasing the line weight of the object. As shown in the map 607, the lines of the streets 603 has been increased in weight to the produce the exaggerated streets 609, thereby increasing its prominence.

FIG. 6B depicts a map 621 on which the elimination process is applied to reduce the overall detail of the map 621. Elimination selectively removes smaller objects to remove clutter or to remove objects that are too small to be effectively rendered or less important objects even though they may be large in size. As shown, map objects 623a-623d have been eliminated to produce the map 625. The reduced number of objects in the map 625 results in less clutter and a more prominent display of the remaining objects.

FIG. 6C depicts a map 641 on which the typication process is applied to reduce the over-detail of the map 641. Typication is a form of elimination which only similar objects are eliminated. Other remaining similar objects provide a perceptual representation of the general locations of the eliminated objects while reducing clutter. As shown, the map 641 has a large number of similar map objects. After typication, the resulting map has a reduced number of the similar objects but still indicates the general positions of the eliminated objects. In this way, map clutter is reduced without losing too much information.

FIG. 6D depicts a map 661 on which the outline simplication process is applied to reduce the over-detail of the map 661. Outline simplication reduces the complexity of vector curves representing map objects in a typical electronic mapping service. The map 661 includes three map objects a park 663, a river 665, and a park 667 that are made of curves of varying complexity. After the outline simplication process the number of points used to objects 663-667 are reduced to produce the map 669 including the corresponding map objects (i.e., a park 671, a river 673, and a park 675). Comparing the objects 671-675 to their respective counterpart objects 663-667, the objects 671-675 have reduced jaggedness and detail.

Figure 7:
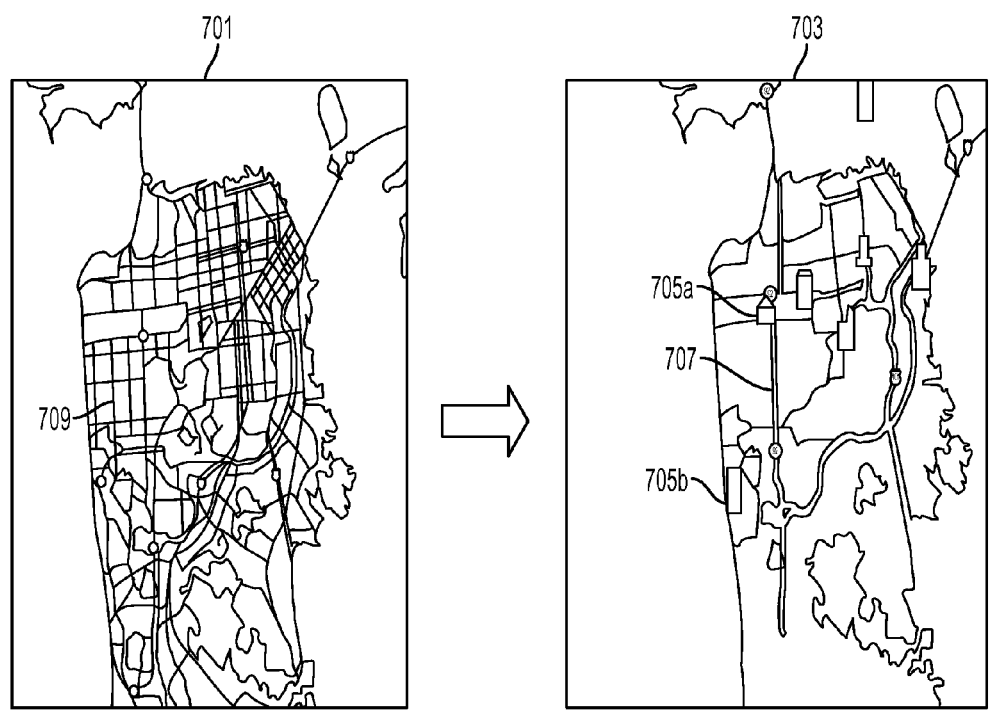
FIG. 7 is a diagram of a map contextually rendered to provide tourist information, according to one embodiment.

FIG. 7 is a diagram of a map contextually rendered to provide tourist information, according to one embodiment. As shown, map 701 is conventional map rendered without customization to reflect context. The approach for providing contextual rendering of map is applied to the map 701 to produce a map 703 contextually rendered for a tourist. By way of example, tourist maps generally highlight POIs and show roads that connect between these POIs. In contextually render the map 703, an array of weighted markers representing the importance of the POIs are retrieved from the mapping service 105. The mapping service 105 and/or the semantic mapping platform 103 also apply a routing algorithm and find the routes from every marker to every other marker. In one embodiment, an existing routing algorithm such as map24 Navteq can be used. Each route gets a weight to it based on the least important of the two markers points. If two routes overlap in any segment, the semantic mapping platform 103 takes the bigger of the two weights as the value for the segment. After the weights of routes and markers are determined, the semantic mapping platform 103 clusters the POIs markers in to bins (e.g., partitioned sections of the map). The number of bins is, for instance, dependent on the zoom level.

In this example, the bins are delineated by latitude and longitude. The semantic mapping platform 103 uses latbin and longbin, which are the number of bins in the latitude and longitude directions respectively. In particular, the semantic mapping platform 103 uses latbin*(2^zoomlevel) and longbin*(2^zoomlevel) to determine how many bins are present per zoom level. To cluster the marker on the map, the semantic mapping platform 103 starts at the lowest zoom level and then places the landmarks in the bins iteratively. When there is more than one landmark (or another maximum number of objects) in a bin, the semantic mapping platform 103 chooses the landmark with the most importance relative to the context. The semantic mapping platform 103 then looks at the next zoom level and clusters the markers that were the most important in each bin in previous zoom level. Each time a zoom operation is performed, there are fewer bins because the bins remain constant in area, and the process can be continued iteratively until there only one bin left.

As shown in FIG. 7, the contextual rendering process eliminates the clutter (e.g., the extraneous streets 709) from the map 701 to produce a stylized tourist map 703. The tourist map 703 includes, among other things, major tourist attractions 705a-705b differentially rendered to include enlarged depictions of the attractions themselves. These depictions are exaggerated to more clearly highlight them to tourists. In addition, the map 703 renders only those streets (e.g., street 707) that connect the various attractions (e.g., POIs). In this way, semantic mapping platform 103 can create a tourist contextual map using automated processes.

Figures 8A, 8B:
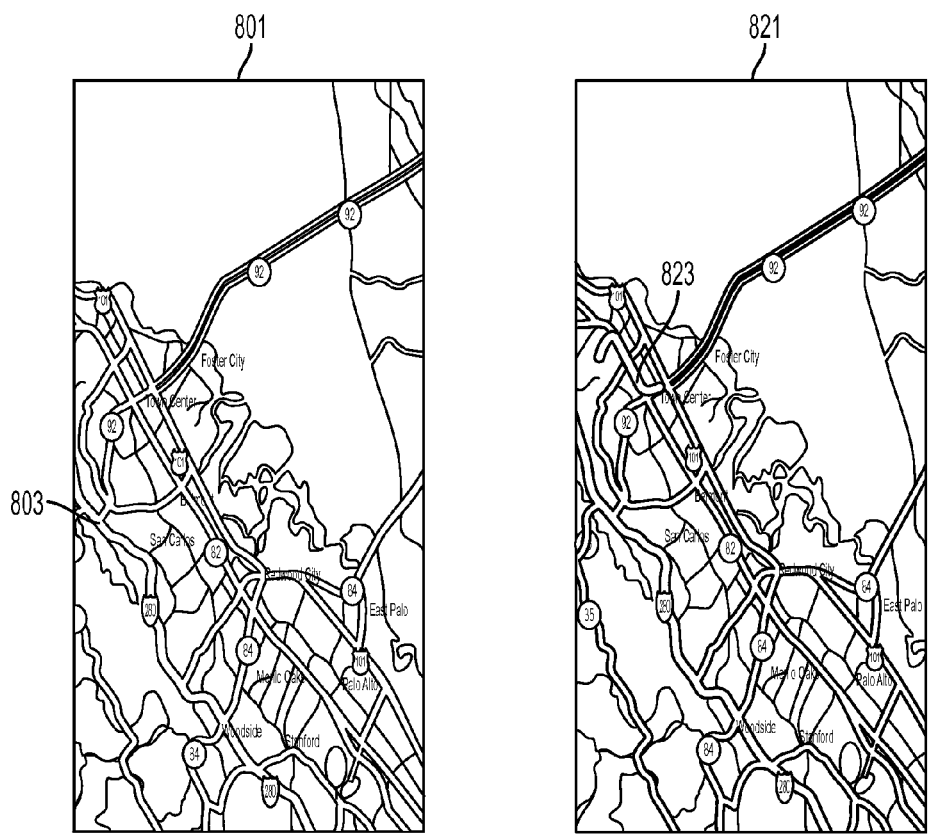
FIGS. 8A-8C are diagrams of maps contextually rendered to provide traffic information at differing levels of semantic zoon, according to various embodiments.
Figure 8C:
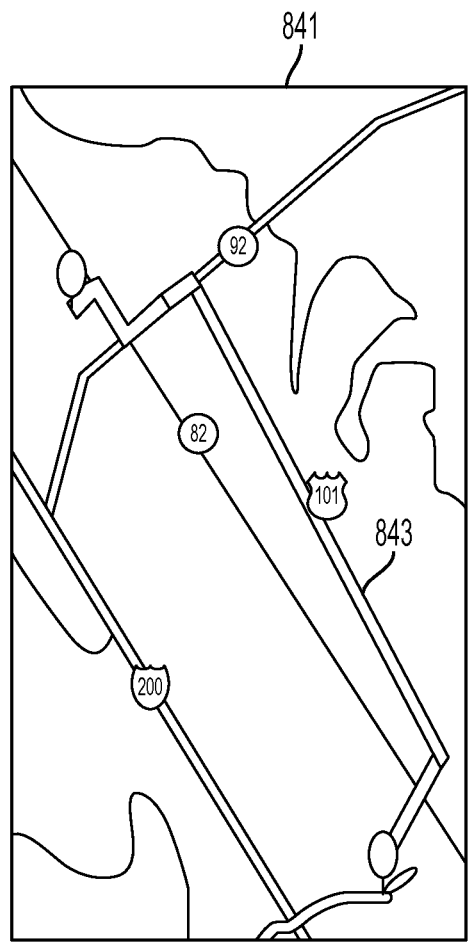

FIGS. 8A-8C are diagrams of maps contextually rendered to provide traffic information at differing levels of semantic zoon, according to various embodiments. Traditionally, traffic information is displayed on maps for all roads on which the provider has traffic information. FIG. 8A shows an example of a typical traffic map 801 that is provided to all users. Showing the same information for all users is highly scalable but provides too much information. For example, traffic information 803 (indicated by the highlighted road) that is not on a user's potential route(s) is often irrelevant. As traffic information becomes available on more and more roads, the clutter will be overwhelming.

The example of FIG. 8B includes a system that provides traffic-aware routes. The system also uses a GPS system or other location sensor system (e.g., cellular triangulation, assisted GPS, etc.) to determine the user's current location. The user indicates a destination. Next, the system: (1) finds potential routes to the destination; (2) calculates the estimated travel time over each potential route based on current traffic conditions; (3) removes the extraneous traffic information from the map; and (4) displays only the route(s) with relevant information.

This contextual map 821 is illustrated in FIG. 8B. As illustrated, the map 805 displays only the traffic and related incidents 823 (e.g., accidents, construction, road closures, special events) along the potential route(s) to the destination. In this way, a user of the map can quickly see the traffic information of most relevance rather than viewing all traffic within the mapped area.

As depicted in FIG. 8C, the map 841 can include further customizations and contextual rendering over the map 821 of FIG. 8B. By way of example, these further customizations entail redrawing the map 841 for the route using retargeting or semantic zooming techniques as discussed with respect to FIG. 4 above. These techniques include, for instance, simplifying the rendered shapes of map features and removing extraneous map features. Map features can include roads, water bodies, green spaces (e.g., parks), points of interest (e.g., universities or shopping centers), labels, and so on. The map 841 includes a stylized and much simplified rendering of the traffic along the user's route. This contextual rendering is advantageous for mapping programs in general and navigation programs in particular because the user will be able to quickly perceive the traffic information in the map 841 because of the de-cluttering.

The above-described embodiments can be used with numerous cartographic principles and designs to display quantitative and qualitative information, such as urban maps for navigational or real estate use (wherein objects include buildings, parking lots, etc.), nature park maps (where objects include fountains, caves, feeding ground, etc.), resource maps (where objects include corn fields, wheat fields, oil fields, gas fields, etc.), exhibition area maps (where objects include exhibit booths, etc.), amusement park maps (where objects include theme rides, restaurants, restrooms, information desks, etc.), etc.

The contextual maps can contain as many objects or points of interest (POIs) as can be rendered on a display while maintaining legibility. The contextual map makes it easier for the user to locate in the map any contextually relevant or important information. In addition to availability on the UE 101, the contextual map may be available online or onboard in most navigation-enabled vehicles. The contextual map may also be adapted for express delivery services, emergency and government routing plans, efficient field service management, numerous fleet operations, mobile commerce, and any location based services (LBS). This degree of map presentation customization has unlimited adoption based upon types and sources of user interest data. The described embodiments provide maps rendered according to contextual information relevant to particular individuals.

The processes described herein for providing contextual rendering of a map may be advantageously implemented via software, hardware (e.g., a general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
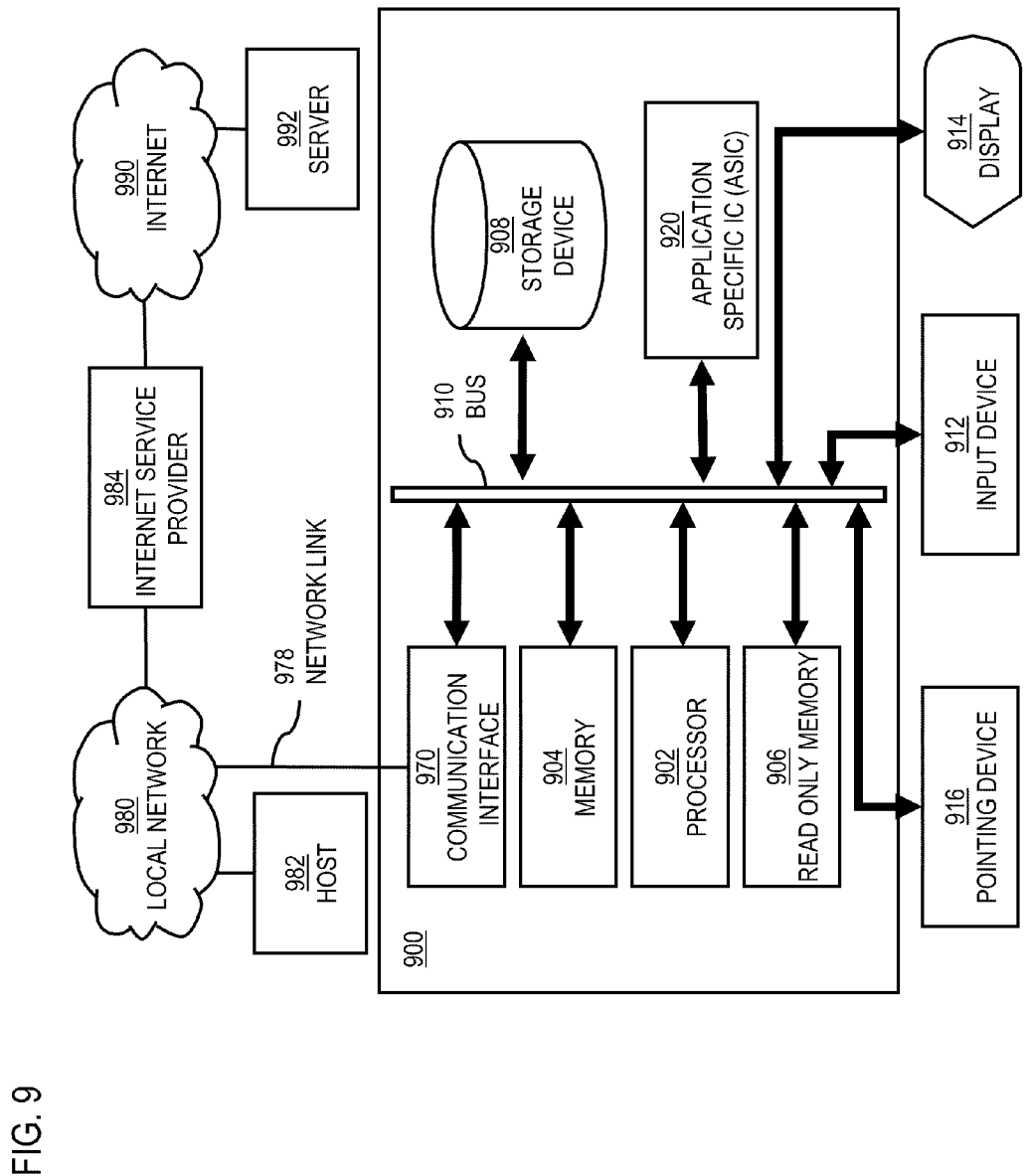
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide contextual rendering of a map as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing contextual rendering of a map.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing contextual rendering of a map. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing contextual rendering of a map. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing contextual rendering of a map, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for providing contextual rendering of a map to the UE 101.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
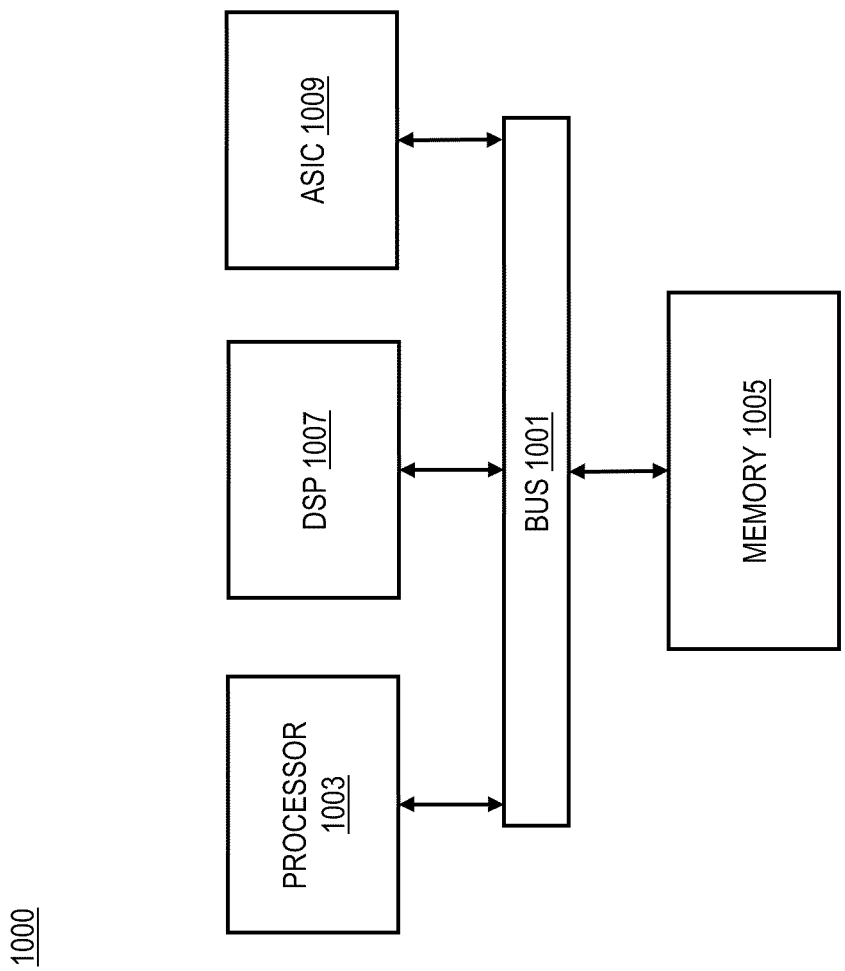
FIG. 10 is a diagram of a chip set that can be used to implement an embodiment of the invention.

FIG. 10 illustrates a chip set 1000 upon which an embodiment of the invention may be implemented. Chip set 1000 is programmed to provide contextual rendering of a map as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of providing contextual rendering of a map.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide contextual rendering of a map. The memory 1005 also stores the data associated with or generated by the execution of the inventive steps.

Figure 11:
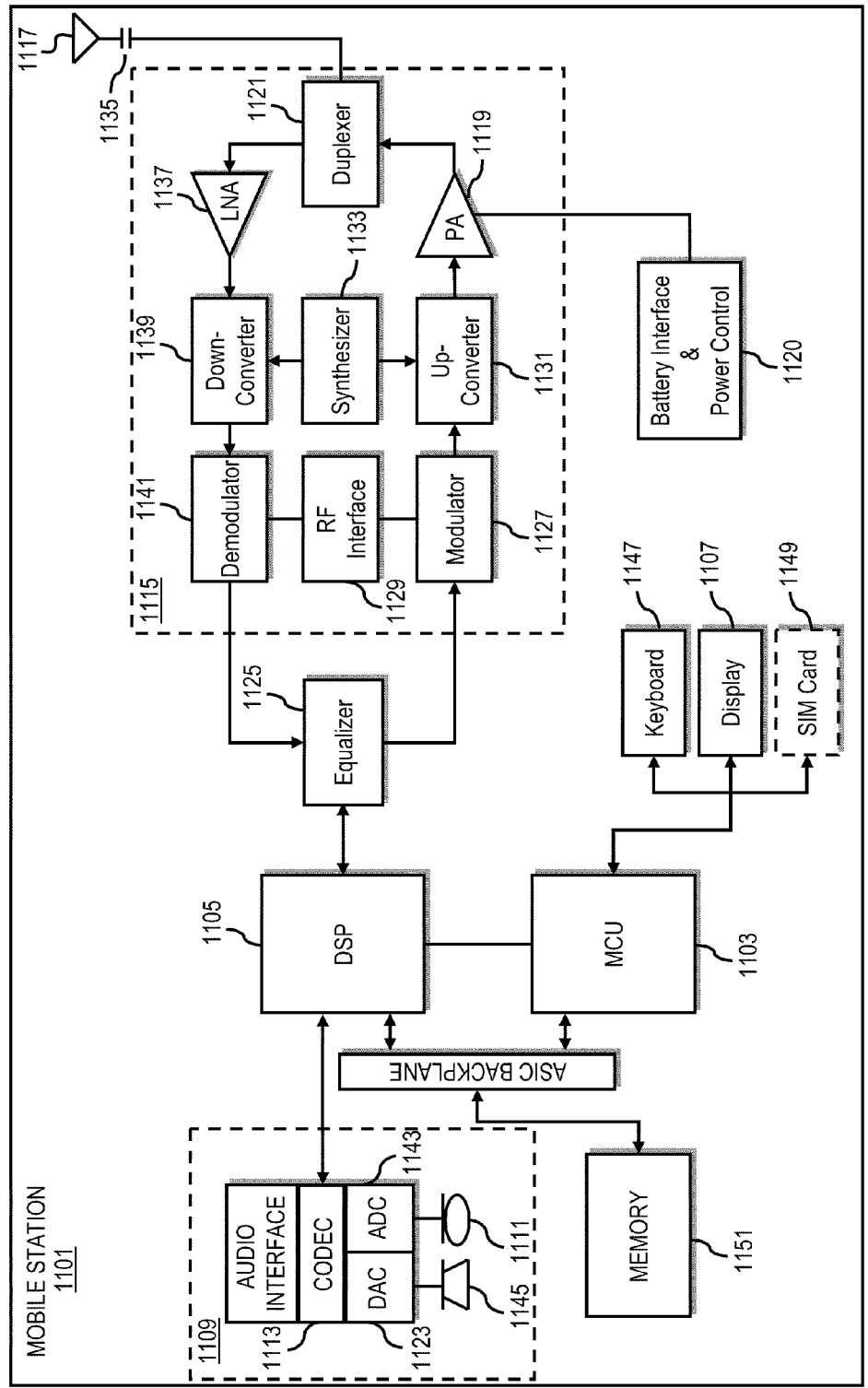
FIG. 11 is a diagram of a mobile terminal (e.g., a handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of providing contextual rendering of a map. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing contextual rendering of a map. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide contextual rendering of a map. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by an apparatus, context information for rendering a geographic map on a user interface of a device, wherein the context information includes a recent history of online searches, recently viewed websites, one or more keywords in recent communications with contacts of a user of the device, or a combination thereof collected at the device;
   classifying, by the apparatus without user intervention, a plurality of objects available for display in the geographic map based on a level of importance of each of the objects to the user with respect to the context information;
   in response to a change of semantic zoom levels selected by the user, prioritizing, by the apparatus, rendering of the objects based on the classification; and
   initiating, by the apparatus, a rendering of the objects in the geographic map based, at least in part, on the prioritization and a temporal order using a vector rendering engine, while displaying an identical physical area in the geographic map.

2. A method of claim 1, wherein a section of the geographic map corresponding to one or more of the objects associated with the highest prioritization is rendered first, and the context information further includes a current geographic location of the device, one or more historical travel patterns of the device, one or more activities of the user, or a combination thereof.

3. A method of claim 1, further comprising:
   determining display information about the user interface of the device;
   determining detail capacity associated with a total amount of detail that can be presented in the user interface; and
   allocating the detail capacity among the objects to be rendered in the geographic map according to the prioritization,
   wherein the rendering is performed differentially according to the allocation.

4. A method of claim 3, wherein the differential rendering applies one or more techniques of exaggeration, elimination, typication, outline simplification, or a combination thereof.

5. A method of claim 3, wherein the differential rendering pregenerates tiles of differing amounts of detail that can be iteratively displayed using a map tile renderer.

6. A method of claim 3, wherein the detail capacity is determined, at least in part, on a specified level of zoom for rendering the geographic map, a size of the geographic map, a style of the geographic map, or a combination thereof.

7. A method of claim 3, wherein the geographic map is partitioned into sections and the detail capacity is determined individually for each section.

8. A method of claim 1, wherein the geographic map is a hiking map, a shopping map, a subway map, a pedestrian map, or a tourist map.

9. An apparatus comprising:
   at least one processor; and
   at least one memory including computer program code,
   the at least one memory and the computer program code configured to, with the at least one processor, cause the apparatus to perform at least the following,
   determine context information for rendering a geographic map on a user interface of a device, wherein the context information includes a recent history of online searches, recently viewed websites, one or more keywords in recent communications with contacts of a user of the device, or a combination thereof collected at the device;
   classify a plurality of objects available for display in the geographic map based on a level of importance of each of the objects to the user with respect to the context information;
   in response to a change of semantic zoom levels selected by the user, prioritize rendering of the objects based on the classification; and
   initiate a rendering of the objects in the geographic map based, at least in part, on the prioritization and a temporal order using a vector rendering engine, while displaying an identical physical area in the geographic map.

10. An apparatus of claim 9, wherein a section of the geographic map corresponding to one or more of the objects associated with the highest prioritization is rendered first, and the context information further includes a current geographic location of the device, one or more historical travel patterns of the device, one or more activities of the user, or a combination thereof.

11. An apparatus of claim 9, wherein the apparatus is further caused to:
  determine display information about the user interface of the device;
  determine detail capacity associated with a total amount of detail that can be presented in the user interface; and
  allocate the detail capacity among the objects to be rendered in the geographic map according to the prioritization,
  wherein the rendering is performed differentially according to the allocation.

12. An apparatus of claim 11, wherein the differential rendering applies one or more techniques of exaggeration, elimination, typication, outline simplification, or a combination thereof.

13. An apparatus of claim 11, wherein the differential rendering pregenerates tiles of differing amounts of detail that can be iteratively displayed using a map tile renderer.

14. An apparatus of claim 11, wherein the detail capacity is determined, at least in part, on a specified level of zoom for rendering the geographic map, a size of the geographic map, a style of the geographic map, or a combination thereof.

15. An apparatus of claim 11, wherein the geographic map is partitioned into sections and the detail capacity is determined individually for each section.

16. An apparatus of claim 11, wherein the level of association of each of the objects with the context information is classified, at least in part, using semantic information.

17. An apparatus of claim 9, wherein the apparatus is a mobile phone further comprising:
  user interface circuitry and user interface software configured to facilitate user control of at least some functions of the mobile phone through use of a display and configured to respond to user input; and
  a display and display circuitry configured to display at least a portion of a user interface of the mobile phone, the display and display circuitry configured to facilitate user control of at least some functions of the mobile phone.

18. A non-transitory computer-readable storage medium carrying one or more sequences of one or more instructions which, when executed by one or more processors, cause an apparatus to at least perform the following steps:
  determining context information for rendering a geographic map on a user interface of a device, wherein the context information includes a recent history of online searches, recently viewed websites, one or more keywords in recent communications with contacts of a user of the device, or a combination thereof collected at the device;
  classifying a plurality of objects available for display in the geographic map based on a level of importance of each of the objects to the user with respect to the context information;
  in response to a change of semantic zoom levels selected by the user, prioritizing rendering of the objects based on the classification; and
  initiating a rendering of the objects in the geographic map based, at least in part, on the prioritization and a temporal order using a vector rendering engine, while displaying an identical physical area in the geographic map.

19. A non-transitory computer readable storage medium of claim 18, wherein a section of the geographic map corresponding to one or more of the objects associated with the highest prioritization is rendered first, and the context information further includes a current geographic location of the device, one or more historical travel patterns of the device, one or more activities of the user, or a combination thereof.

20. A non-transitory computer readable storage medium of claim 18, wherein the apparatus is caused to further perform:
  determining display information about the user interface of the device;
  determining detail capacity associated with a total amount of detail that can be presented in the user interface; and
  allocating the detail capacity among the objects to be rendered in the geographic map according to the prioritization,
  wherein the rendering is performed differentially according to the allocation.

* * * * *